(12) United States Patent
Fuchs et al.

(10) Patent No.: US 10,513,148 B2
(45) Date of Patent: Dec. 24, 2019

(54) CONNECTING ARRANGEMENT FOR CONNECTING A SHAFT TO A COMPONENT

(71) Applicant: Neumayer Tekfor Engineering GmbH, Hausach (DE)

(72) Inventors: Christian Fuchs, Fischerbach (DE); Thomas Etzold, Offenburg (DE); Martin Lehmann, Hornberg (DE)

(73) Assignee: Neumayer Tekfor Engineering GmbH, Hausach (DE)

( * ) Notice: Subject to any disclaimer, the term of this patent is extended or adjusted under 35 U.S.C. 154(b) by 179 days.

(21) Appl. No.: 15/796,161

(22) Filed: Oct. 27, 2017

(65) Prior Publication Data

US 2018/0117964 A1    May 3, 2018

(30) Foreign Application Priority Data

Oct. 28, 2016 (DE) .......................... 10 2016 012 947

(51) Int. Cl.
*B60B 35/00*    (2006.01)
(52) U.S. Cl.
CPC .................................. *B60B 35/004* (2013.01)
(58) Field of Classification Search
CPC ....... B60B 35/004; F16D 1/076; F16D 1/033; F16D 1/108; F16D 2003/22323; F16D 2001/103
USPC ........................................................ 301/126
See application file for complete search history.

(56) References Cited

U.S. PATENT DOCUMENTS

| 3,465,545 | A | * | 9/1969 | Stamm | ................. | B23K 20/129 |
| | | | | | | 464/179 |
| 4,003,444 | A | * | 1/1977 | Nobutomo | .............. | B60T 1/062 |
| | | | | | | 180/346 |
| 4,784,441 | A | * | 11/1988 | Welschof | ............ | B60B 27/0005 |
| | | | | | | 180/258 |
| 2001/0016520 | A1 | * | 8/2001 | Sahashi | ................... | B60B 27/00 |
| | | | | | | 464/182 |
| 2008/0104844 | A1 | * | 5/2008 | Lutz | ........................ | F16D 1/076 |
| | | | | | | 29/893.33 |
| 2016/0017929 | A1 | * | 1/2016 | Sugiyama | .............. | B60K 17/22 |
| | | | | | | 464/15 |

FOREIGN PATENT DOCUMENTS

| DE | 102 08 962 A1 | 10/2003 |
| DE | 10 2006 012 031 A1 | 9/2006 |
| DE | 10 2009 043 269 A1 | 3/2011 |

(Continued)

OTHER PUBLICATIONS

German-language Search Report issued in counterpart German Application No. 10 2016 012 947.6 dated Oct. 2, 2017 with partial English translation (11 pages).

*Primary Examiner* — S. Joseph Morano
*Assistant Examiner* — Jean W Charleston
(74) *Attorney, Agent, or Firm* — Crowell & Moring LLP

(57) ABSTRACT

A connecting arrangement for connecting a shaft to a component is provided. The connecting arrangement includes at least one adapter device with is connectable to the shaft at least in a force-fitting and/or form-fitting manner, and contact surfaces of the component and of the adapter device are configured in a manner matching each other to inhibit rotation relative to one another about a longitudinal axis of the adapter.

8 Claims, 5 Drawing Sheets

(56) References Cited

FOREIGN PATENT DOCUMENTS

| GB | 2506454 A | 4/2014 |
|---|---|---|
| JP | 2013-253645 A | 12/2013 |
| JP | 2014-5915 A | 1/2014 |

\* cited by examiner

CONNECTING ARRANGEMENT FOR CONNECTING A SHAFT TO A COMPONENT

CROSS REFERENCE TO RELATED APPLICATIONS

This application claims priority under 35 U.S.C. § 119 from German Patent Application No. 10 2016 012 947.6, filed Oct. 28, 2016, the entire disclosure of which is herein expressly incorporated by reference.

BACKGROUND AND SUMMARY OF THE INVENTION

The present invention relates to a connecting arrangement for connecting a shaft to a component.

The invention refers in general to a shaft connection.

In the prior art, connections of shafts in motor vehicles are frequently realized as flange connections. Advantages thereof include the clearance-free connection by means of a force fit, the simple realization of centering and the fastening by means of screws. Disadvantages include the not inconsiderable mass of the flanges, the additionally required construction space in the diameter and the increased outlay on installation because of the necessity of a plurality of screws.

Alternatively, direct shaft connections are realized, wherein, without flange connections, the torque is transmitted via a spline connection. The challenges lie here in the axial securing of the connection and in the finding of a compromise between good fittability (clearance fit) and zero backlash or centering (interference fit). Advantages include the small mass, the simple fittability and the little amount of construction space required.

Refinements for connecting joints to shafts are disclosed, for example, by DE 102 08 962 A1 or DE 10 2006 012 031 A1.

The object of the invention consists in proposing a connecting arrangement which avoids the disadvantages of the prior art.

The invention achieves the object with a connecting arrangement for connecting a shaft to a component. The component is, for example, a joint part. In addition, the shaft is, for example, a gear shaft as part of a drive train of a vehicle.

The connecting arrangement for connecting a shaft to a component has at least one adapter device. The adapter device and the shaft are configured and coordinated with each other in such a manner that the adapter device and the shaft are connectable to each other at least in a force-fitting and/or form-fitting manner. The component has a contact surface and the adapter device has a contact surface. The contact surface of the component and the contact surface of the adapter device are configured here in a manner matching each other.

The advantages of the invention are the space-saving shape, the simple installation, the low backlash after installation and the good centering.

One advantage furthermore is that a customary shaft can be used. Many shafts—or more precisely: the shaft journals thereof virtually as connecting intersections of the shafts—generally have a thread on the end side. Said threads can be used either unchanged, or just slight modifications, such as, for example, trimming, may be necessary.

In the case of the connecting arrangement according to the invention, a force-fitting and/or form-fitting connection is produced between the shaft and an adapter device. Furthermore, the adapter device and the component each have a contact surface, wherein the two contact surfaces are configured in a manner matching each other. These contact surfaces are used, in particular in the fitted state, in order for the adapter device and the component to be connected to each other. The contact between adapter device and component therefore takes place via the contact surfaces. Overall, the shaft and the component are therefore indirectly connected to each other via the adapter device.

The following refinements refer to the at least force-fitting connection between shaft and adapter device, wherein "force-fitting" should also be understood here as meaning the transmission of torques.

According to one refinement, it is provided that the shaft and the adapter device are connected to each other by a nut.

One refinement includes the fact that an internal thread of the nut is configured in a manner matching an external thread of the shaft.

In one refinement, the adapter device in particular has a continuous recess which serves in particular for the passage of the shaft through the adapter device.

According to one refinement, it is provided that the adapter device has a cup-like interior space for receiving the nut. If the nut is located in the cup-like interior space, it can connect the adapter device to the shaft upon being tightened in relation to an end-side external thread of the shaft.

One refinement includes the fact that the adapter device has an internal toothing which is configured in a manner corresponding to an external toothing of the shaft. The adapter device is fixed via said internal toothing in relation to rotations on the shaft. In addition, the torque can thus be transmitted between shaft and adapter device.

The refinements below concentrate on the mutually matching contact surfaces of adapter device and component.

According to one refinement, it is provided that an end-side crown toothing of the component forms the contact surface of the component, and an end-side crown toothing of the adapter device forms the contact surface of the adapter device. The end-side crown toothing of the component and the end-side crown toothing of the adapter device are configured here in a manner matching each other. In this refinement, two crown toothings which are each located on the end sides or end surfaces of the adapter device and of the component are therefore brought into contact with each other. An alternative name for a crown toothing is a serration.

One refinement includes the fact that a longitudinal toothing of the component forms the contact surface of the component, and a longitudinal toothing of the adapter device forms the contact surface of the adapter device. The longitudinal toothing of the component and the longitudinal toothing of the adapter device are configured in a manner matching each other. In this refinement, the contact surfaces each have longitudinal toothings which are preferably provided on the outer sides and inner sides of the adapter device and of the component and furthermore preferably run parallel to a longitudinal axis of the connecting arrangement. In this refinement, the adapter device and the component therefore surround each other at least in sections.

In one refinement, the contact surfaces have such coefficients of friction that a frictional connection is produced between the two contact surfaces.

In the further refinements, the axial fixing between the adapter device and the component is discussed to some extent. It is intended to be ensured therewith that the contact surfaces which are involved remain in contact with each other. The axial fixing refers here in each case to the longitudinal axis of the connecting arrangement, which is, for example, the longitudinal axis of the shaft and/or of the component.

According to one refinement, it is provided that an end side of the adapter device and an end side of the component are configured in a flange-like manner. In this refinement, two circular ring-shaped flanges which extend radially outward therefore lie opposite each other.

One refinement comprises the fact that the flange-like end side of the adapter device has at least one recess, and the flange-like end side of the component has at least one recess. The at least one recess of the adapter device and the at least one recess of the component are configured for the introduction of a screw. In this refinement, the flanges are therefore used to the effect that screws can be introduced via the radially outwardly protruding flanges through recesses in the flanges.

According to one refinement, it is provided that there is at least one screw. The at least one screw fixes the adapter device and the component to each other axially along a longitudinal axis. In one refinement, the screw is combined with a nut.

One refinement comprises the fact that the component or the adapter device has an external thread for a union nut. In this refinement, a union nut which is screwed to an external thread permits the axial fixing.

According to one refinement, it is provided that the adapter device or the component has a radially extending stop surface for a union nut. In one refinement, the element (adapter device or component) which does not bear a previously mentioned external thread for the union nut has the radially extending stop surface.

One refinement comprises the fact that there is a union nut. The union nut fixes the adapter device and the component to each other axially along a longitudinal axis.

According to one refinement, it is provided that the component is an external part or an internal part of a joint. The joint is, for example, a sliding joint or a fixed joint.

One refinement comprises the fact that the component consists of at least two elements. By means of a multi-part structure of the component, different material properties and/or production methods can be combined with one another. In one refinement, the at least two elements differ in that one element bears the contact surface of the component, and the other element is characterized particularly by the properties and functions of the component per se. The element with the contact surface preferably forms part of the end side of the component, which end side faces the shaft.

In one refinement, the at least two elements have different material properties.

According to one refinement, it is provided that one of the at least two elements is a forged component, and the other of the at least two elements is a sheet-metal component.

According to a refinement in which the component consists of at least two elements, only one of the two elements bears a longitudinal toothing preferably forming the contact surface of the component. In an alternative refinement, one of the at least two elements has the abovementioned crown toothing or a specially designed contact surface—for example with regard to the coefficient of friction.

If the component consists of a plurality of elements, the latter in one refinement are welded to one another.

According to one refinement, it is provided that the shaft is a gear shaft with an external toothing and an end-side external thread.

Other objects, advantages and novel features of the present invention will become apparent from the following detailed description of one or more preferred embodiments when considered in conjunction with the accompanying drawings.

BRIEF DESCRIPTION OF THE DRAWINGS

In detail, there are a multiplicity of possibilities for refining and developing the device according to the invention. For this purpose, reference is made firstly to the patent claims following patent claim 1 and secondly to the description below of exemplary embodiments in conjunction with the drawing, in which:

DETAILED DESCRIPTION OF THE DRAWINGS

Figure 1:
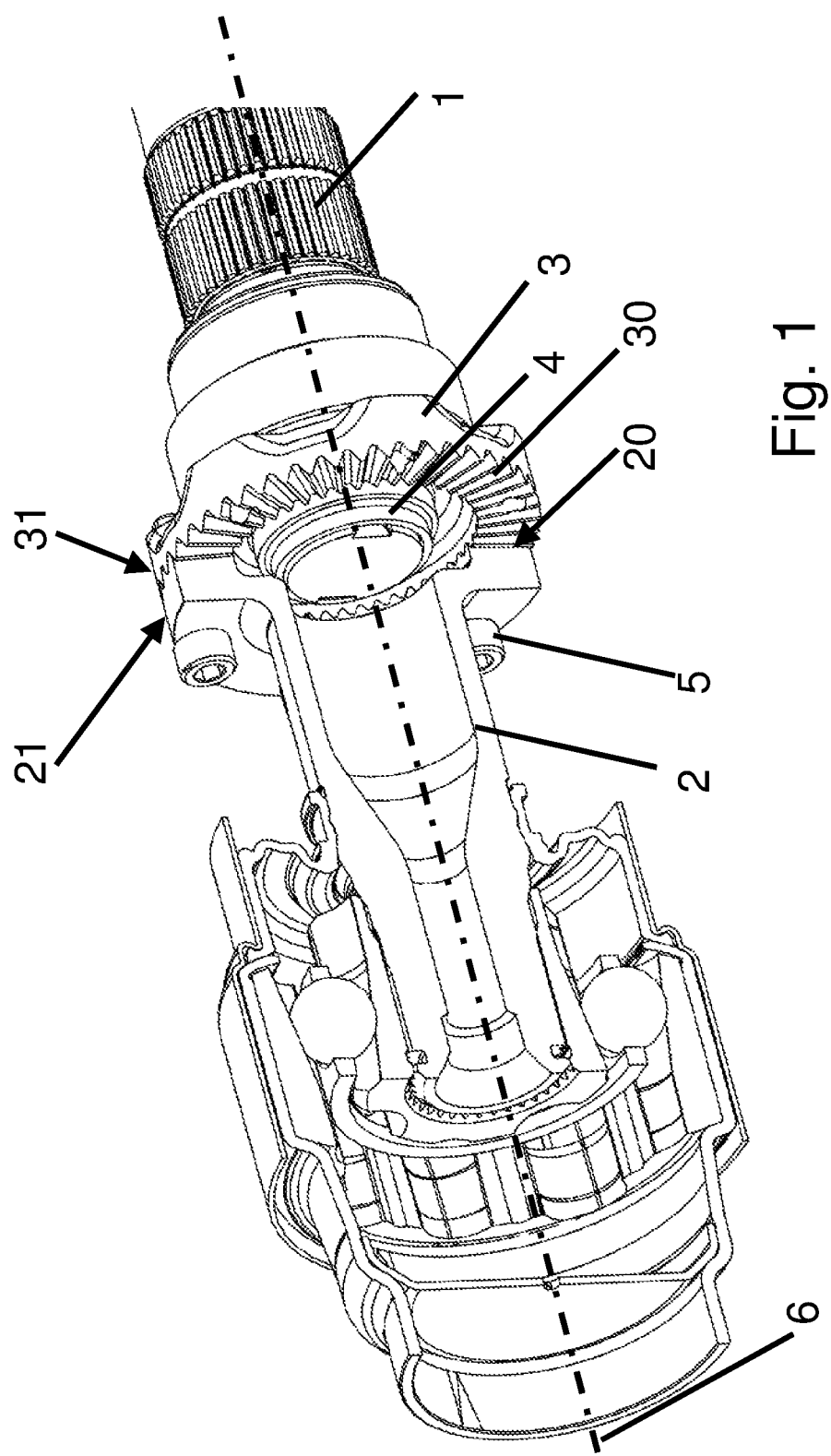
FIG. 1 shows a partially sectioned three-dimensional illustration of a first variant of a connecting arrangement.

FIG. 1 shows a first refinement of the connecting arrangement between a shaft 1 and a component 2, which here is an inner part of a sliding joint. The shaft 1 is a conventional shaft (e.g. gear shaft) which has a lateral longitudinal toothing and an external thread at its front end. The shaft 1 is supplemented by the adapter device 3 which is connected to the shaft 1 by the nut 4 in a force-fitting and torque-locking manner. The adapter device 3 permits the connection of the shaft 1 to the component 2 without complicated refinements or modifications of the shaft 1 being required.

For the actual connection between the adapter device 3, as an extension or supplement of the shaft 1, and the component 2, respective contact surfaces 30, 20 are provided: in the refinement shown here, the two contact surfaces 20, 30 each have crown toothings (alternative name is a serration) which correspond and therefore match each other. The crown toothings are present here in each case on the end surfaces 21, 31 of the component 2 and of the adapter device 3, respectively. In general, crown toothings are purely axially effective, plane-side toothings. With crown toothings, connections which can transmit high torques and also provide good centering properties for the installation can be realized in a small space and with little overlap. A crown toothing provides a high power density (i.e. a high transmission capability in a small space), has a centering effect, has no backlash in the fitted state and can be simply fitted in particular with the use of nuts (see the examples below). Furthermore, such a crown toothing can be produced highly economically by means of forming processes. Insofar as the shaft or the component on which the crown toothing is to be provided already undergoes a forming process, the toothing can be introduced virtually cost-neutrally.

The end surfaces 21, 31 are additionally each configured here in a flange-like manner, and therefore the end surfaces 21, 31 in each case extend radially outward. For the axial fixing, use is made of two screws 5 which are introduced into corresponding and continuous recesses of the flange-like end sides 21, 31 and are held, for example, by nuts—only indicated in the upper case here. The screws 5 therefore result in axial fixing between the component 2 and the adapter device 3 or with the latter the shaft 1 along the longitudinal axis 6 of the connecting arrangement, which here is also the longitudinal axis of the shaft 1 and the longitudinal axis of the joint or of the component 2.

Figure 2:
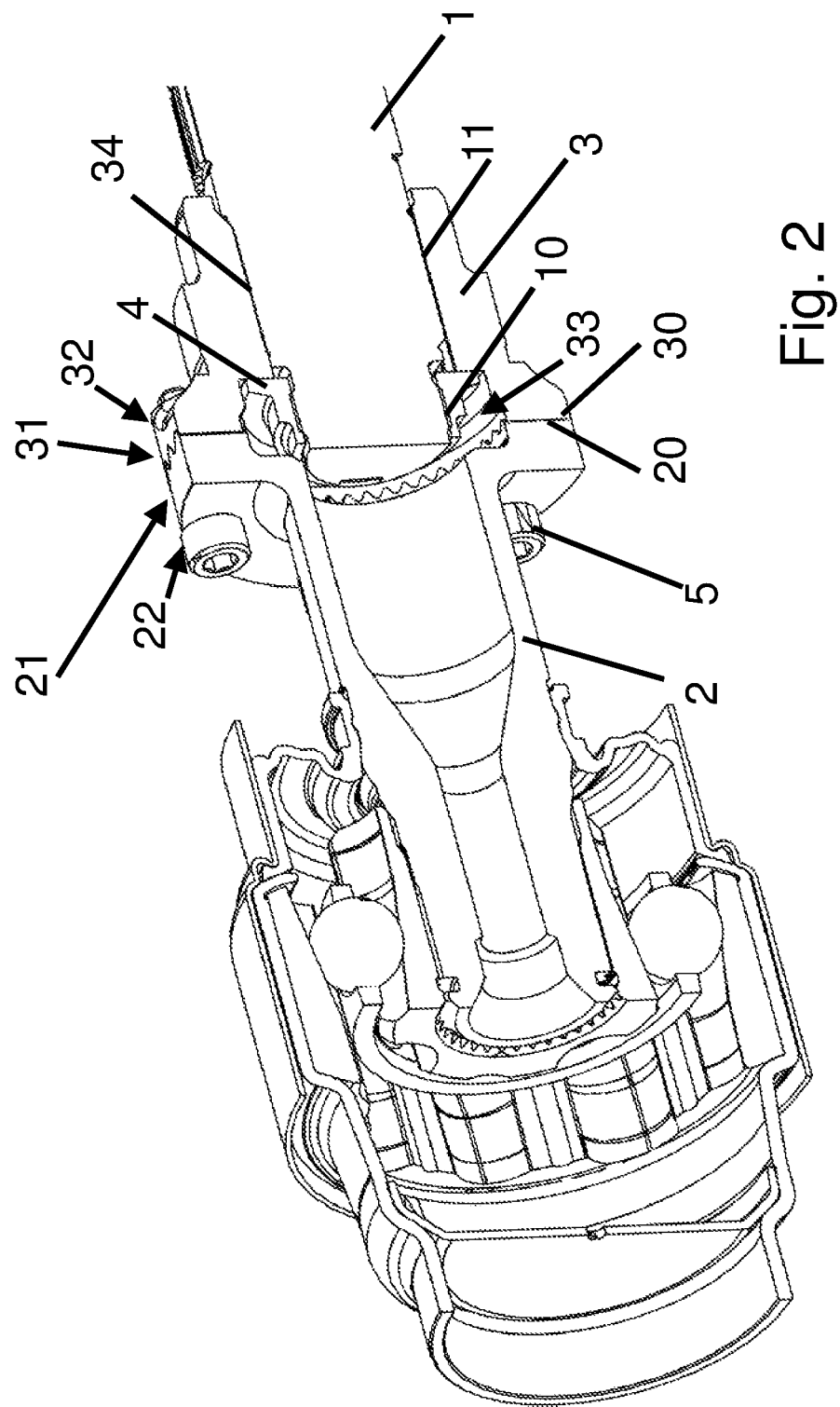
FIG. 2 shows a further illustration of the connecting arrangement of FIG. 1.

FIG. 2 shows a full section through the arrangement of FIG. 1, wherein the crown toothings can be seen by means of the teeth of the contact surfaces 20, 30 of the end surfaces 21, 31 of the component 2 and of the adapter device 3. The recesses 22, 32, which are continuous here, for the screws 5 are also located in the two end surfaces 21, 31.

The connection between the shaft 1 and the adapter device 3 in particular becomes clear in FIG. 2. The adapter device 3 has a cup-like interior space 33 which here in particular faces the component 2. Said cup-like interior space 33 receives the nut 4 which is screwed to the end-side external thread 10 of the shaft 1. The base—provided with a continuous recess—of the cup-like interior space 33 of the adapter device 3 is therefore fixed axially in relation to the shaft 1 and therefore brings about as it were the extension or supplement of the shaft 1 by the adapter device 3. The combination between the internal toothing 34 of the adapter device 3 and the external toothing 11 of the shaft 1 provides for the rotatory fixing between shaft 1 and adapter device 3. It also becomes clear with this that the connecting arrangement uses a shaft 1 known in the prior art with a longitudinal toothing 11 on the outer side and an external thread 10 on the front end by the shaft 1 being adapted by the adapter device 3 to the manner of the connection to a component 2.

Figure 3:
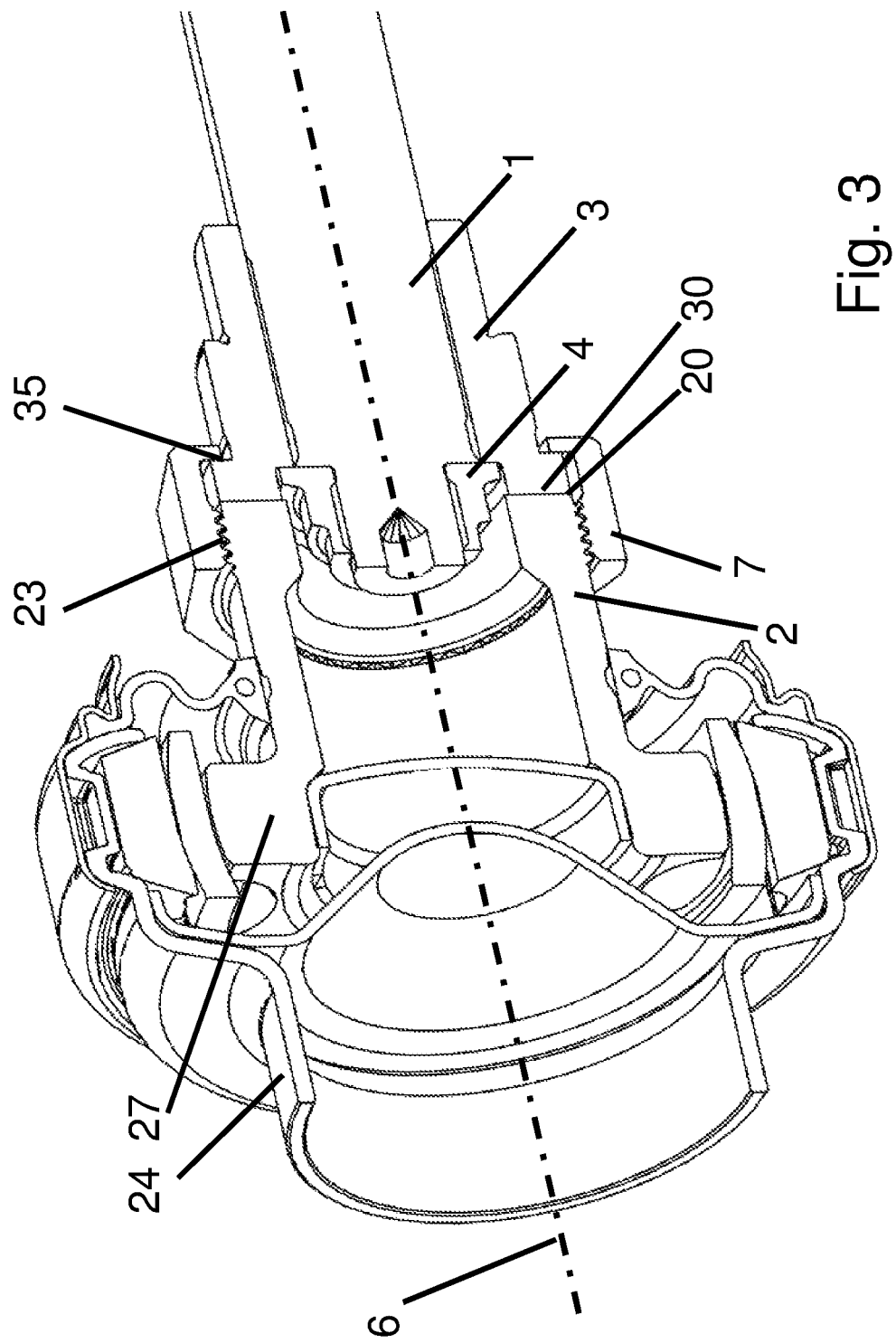
FIG. 3 shows a sectioned three-dimensional illustration of a second variant of a connecting arrangement.

In FIG. 3, the component 2 is the inner part 27 of a joint. The outer part 24 of the joint on the opposite side accordingly surrounds the inner part 27 and the balls serving for the transmission of the torque. The shaft 1 is likewise connected here to the adapter device 3 via the nut 4.

In the direction of the end side and in particular on the side facing away from the component 2, the adapter device 3 has a stop surface 35 which has a sufficiently large radial extent for contact with the union nut 7. The stop surface 35 is formed here via a stepped change in the radial outer extent. The component 2 in the form of the joint inner part 27 has, on its outer side, an external thread 23 which is configured in a corresponding manner to the internal thread of the union nut 7. In the refinement shown, the union nut 7 therefore produces the axial connection between the component 2 and the adapter device 3 and thereby at the same time to the shaft 1 along the longitudinal axis 6.

The contact surface 20 of the component 2 and the contact surface 30 of the adapter device 3 are therefore also formed here in each case by an end-side crown toothing.

Figure 4:
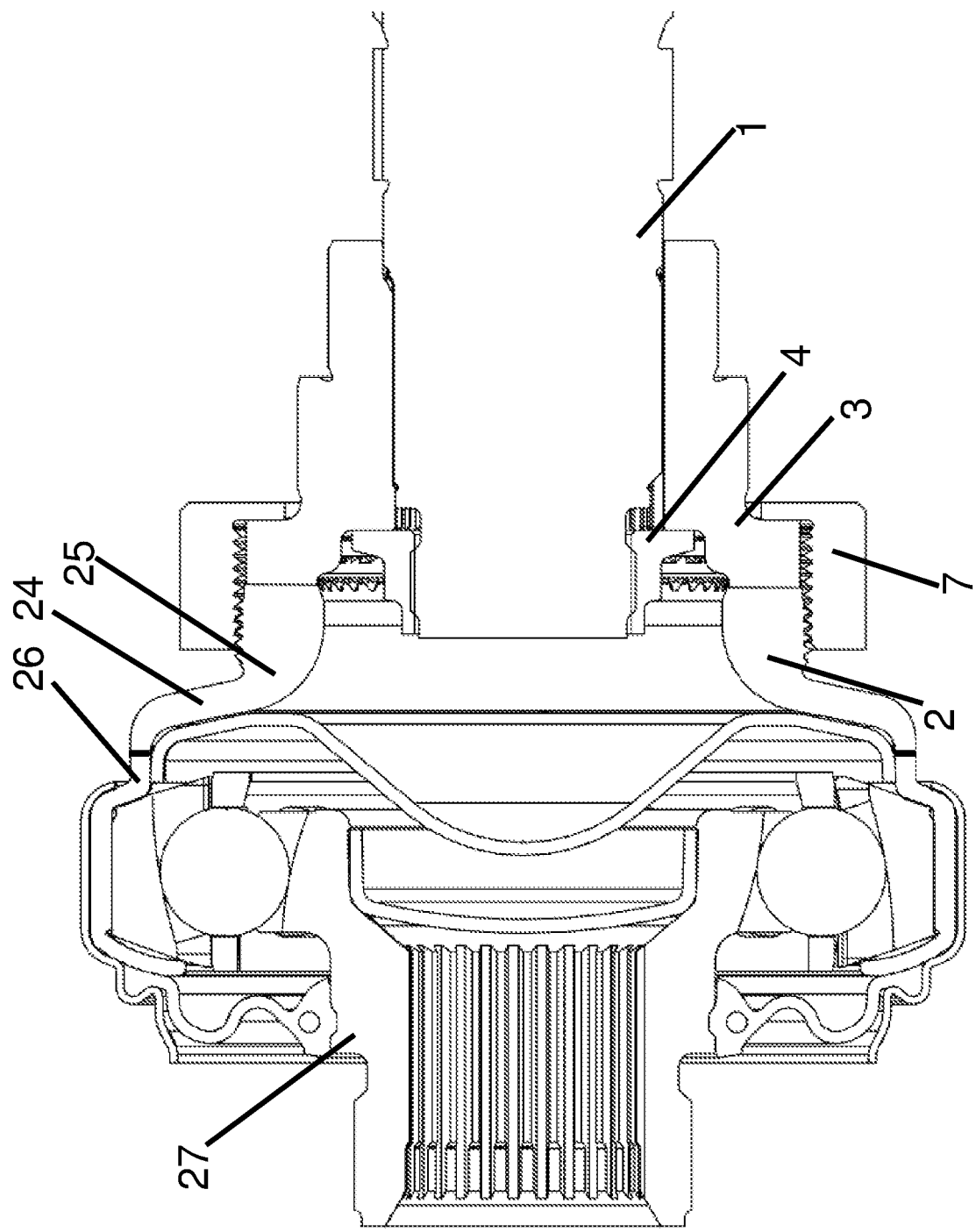
FIG. 4 shows a section through a third variant of a connecting arrangement.

The variant of FIG. 4 differs from the variant of FIG. 3 to the effect that the component 2 is the outer part 24 of a joint, which outer part surrounds an inner part 27 and which is connected to the adapter device 3 via the union nut 7.

The outer part 24 consists here in particular of two elements 25, 26 which have different material properties and also different wall thicknesses here. Firstly, this is an element 25 which faces the adapter device 3 which bears the crown toothing and which is composed of a material which permits forming by forging. The other—therefore, for example, second—element 26 is directly associated with the joint and, for this task, is preferably designed as a sheet metal part. The two elements 25, 26 are connected to each other here via a welding process. Positional errors, for example, can be compensated for via the welding process. By the suitable selection of the materials used and the use of the associated properties, further advantages can therefore be generated. The element 26 which is configured as a sheet-metal part has high toughness over a large diameter, with the other element 25 as a forged part having high strength.

Figure 5:
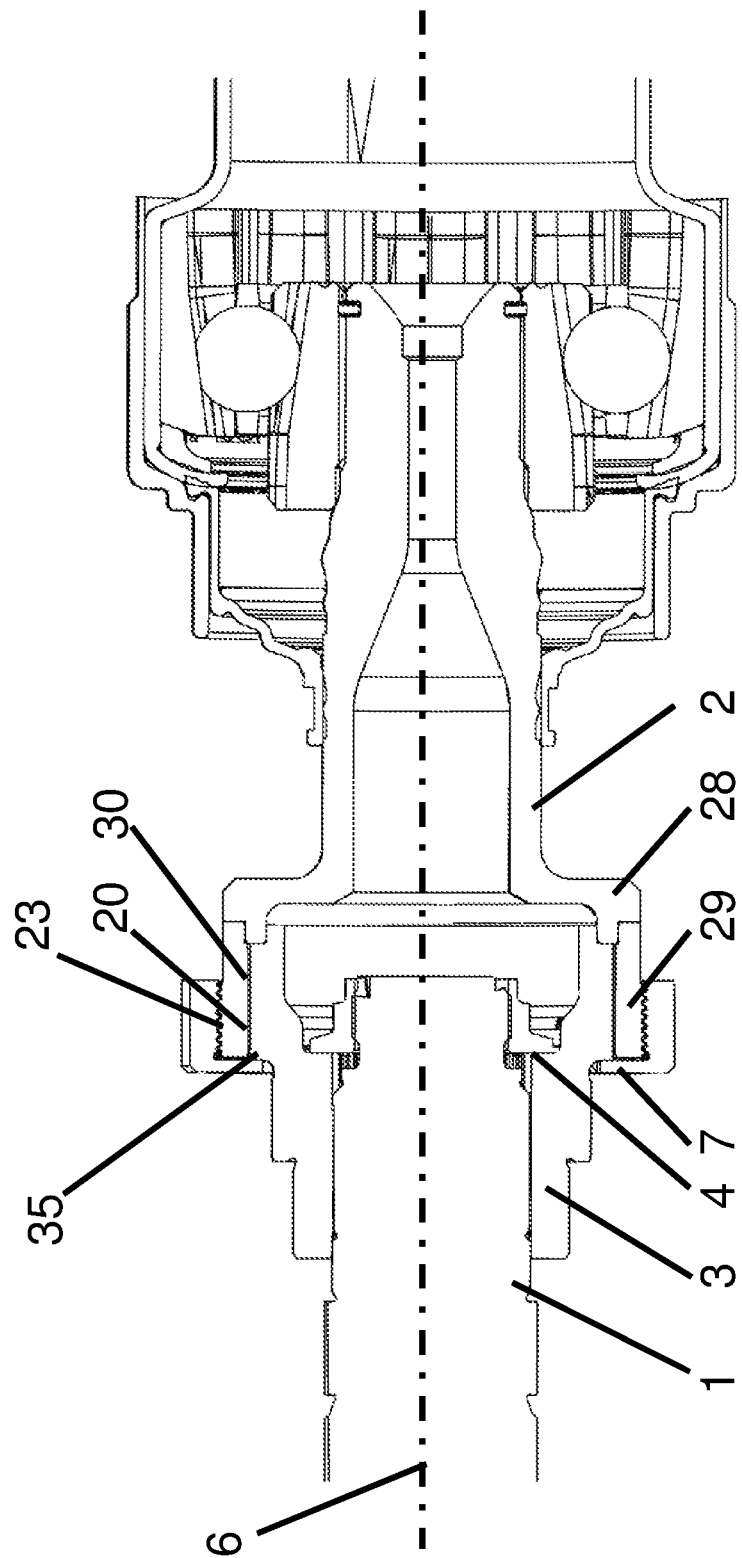
FIG. 5 shows a section through a fourth variant of a connecting arrangement.

The refinement of FIG. 5 differs from the variants of FIGS. 1 to 4 to the effect that the contact surfaces 20, 30 are not formed by crown toothings, but rather by longitudinal toothings. The longitudinal toothings are located here on the outer side of the adapter device 3 and on the inner side of the end side of the component 2. The component 2 is the inner part of a joint.

A union nut 7 serves for the axial fixing along the longitudinal axis 6 between the component 2 and the adapter device 3 which is connected to the shaft 1 by the nut 4. The union nut 7 is screwed onto the external thread 23 of the component 2 until it butts against the stop surface 35 of the adapter device 3.

In the refinement illustrated, the component 2 has, on the end sides, two elements 28, 29 which are connected to each other here, by way of example, via a welded joint. The front element 29 which faces the shaft 1 bears the longitudinal toothing which forms the contact surface 20 to the adapter device 3. In the refinement illustrated, the second element 28 which faces away from the adapter device 3 and therefore also faces closer to the joint has a type of lug which permits centering during the installation.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A connecting arrangement, comprising:
   a shaft adapter;
   a shaft; and
   a component configured to be connected to the shaft by the shaft adapter,
   wherein
   the shaft adapter and the shaft are connectable to each other in a force-fitting and form-fitting manner,
   a contact surface of the shaft adapter is configured to match a contact surface of the component,
   the contact surface of the component is a component crown toothing at an end-side of the component, and
   the contact surface of the shaft adapter is a shaft adapter crown toothing configured to cooperate with the component crown toothing at an end-side of the shaft adapter in a manner which prevents rotation of the shaft adapter relative to the component around a longitudinal axis of the shaft adapter.

2. The connecting arrangement as claimed in claim 1, wherein
   the component includes at least two elements,
   at least two of the at least two elements have different material properties,
   one of the at least two elements having different material properties is a forged element and another one of the at least two elements having different material properties is a sheet-metal element, and
   the component contact surface is located on only the one of the at least two elements that is the forged part.

3. A connecting arrangement, comprising:
   a shaft adapter;
   a shaft; and
   a component configured to be connected to the shaft by the shaft adapter,
   wherein
   the shaft adapter and the shaft are connectable to each other in a force-fitting and form-fitting manner, a contact surface of the shaft adapter is configured to match a contact surface of the component, the component includes at least two elements, at least two of the at least two elements have different material properties, one of the at least two elements having different material properties is a forged element and another one of the at least two elements having different material properties is a sheet-metal element, and the component contact surface is located on only the one of the at least two elements that is the forged part.

4. The connecting arrangement as claimed in claim 3, wherein the contact surface of the component is a component crown toothing at an end-side of the component, and the contact surface of the shaft adapter is a shaft adapter crown toothing configured to cooperate with the component crown toothing at an end-side of the shaft adapter in a manner which prevents rotation of the shaft adapter relative to the component around a longitudinal axis of the shaft adapter.

5. The connecting arrangement as claimed in claim 3, wherein the contact surface of the component is a longitudinal toothing, and the contact surface of the shaft adapter is a shaft adapter longitudinal toothing configured to cooperate with the component longitudinal toothing in a manner which prevents rotation of the shaft adapter relative to the component around a longitudinal axis of the shaft adapter.

6. The connecting arrangement as claimed in claim 3, further comprising:

at least one screw, wherein an end side of the shaft adapter and an end side of the component each have a flange configured to cooperate to axially fix the shaft adapter with the component, shaft adapter and component flanges each have at least one recess configured to cooperate to receive the at least at least one screw such that the at least one screw axially fixes the shaft adapter and component flanges to one another along a longitudinal axis of the shaft adapter.

7. The connecting arrangement as claimed in claim 3, further comprising:

a union nut, wherein component has an external thread configured to cooperate with an internal thread of the union nut in a manner, and the union nut fixes the shaft adapter with the component along a longitudinal axis of the shaft adapter.

8. The connecting arrangement as claimed in claim 3, further comprising:

a union nut, wherein shaft adapter has an external thread configured to cooperate with an internal thread of the union nut, and the union nut fixes the shaft adapter with the component along a longitudinal axis of the shaft adapter.

* * * * *